2,757,140
Patented July 31, 1956

2,757,140

ELECTROLYTE

Francis H. Bush, North Adams, Mass., assignor to Sprague Electric Company, North Adams, Mass., a corporation of Massachusetts No Drawing. Application April 16, 1953,
Serial No. 349,300

4 Claims. (Cl. 252—62.2)

The present invention relates to a new and improved electrolyte composition and to electrolytic capacitors utilizing the same.

The art of manufacturing electrolytic capacitors has been developed down to a very fine point during the past 50 years. At the present time, practically all low-cost, mass-produced electrolytic capacitors being marketed are of the so-called dry type utilizing two electrode foils at least one of which has been coated with an adherent dielectric oxide layer which are separated by some type of an inert spacer and a "dry electrolyte."

The term "dry" as used with respect to these units is in fact a misnomer as these electrolytes consist essentially of a gelled, water-containing mass including inorganic solute. In most cases, this solute is either boric acid, ammonium pentaborate, or other closely related compounds of the same type, or a mixture of any of these compounds. The suspending or gelling agent used with these electrolytes is practically always common ethylene glycol which has been heated together with the other ingredients so as to form a quite viscous conductive mass.

Electrolytes of this type are quite satisfactory for operation over an average range of temperatures. They do, however, suffer from one major defect. The presence of any chloride ion within a condenser tends to shorten the life of the units by a material extent by virtue of corrosion. Although extreme measures are taken to guarantee the purity of the ingredients of the electrolytes employed, as well as to guarantee the purity of the electrodes and of the spacer material used, admittedly, a certain proportion of chloride ions are always present within the final units.

It is an object of the present invention to overcome the disadvantages caused by the presence of these chloride ions within electrolytic capacitors of the type specified. A further object is to produce a new and improved electrolyte composition which is particularly advantageous for use with electrolytic capacitors. These and other objects of the invention, as well as the advantages of it, will be apparent from this description, as well as the appended claims.

Briefly, the above objects are obtained by incorporating a small amount of a compound conforming to the general formula

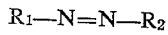

wherein $R_1$ and $R_2$ stand for an aromatic nuclei containing no groups which are reactive within the electrolyte composition. In general, compounds of the indicated category are added to the electrolyte in an amount of from ½ to 5% of the total weight of the electrolyte composition in order to obtain advantageous results.

Representative compounds falling within the scope of the above general formula are azobenzene (which because of its cost, solubility, etc. presently appears to be the preferred additive for use with the invention), 1,1'-azonaphthalene, 1,2'-azonaphthalene, 2,2'-azonaphthalene, o-azotoluene, m-azotoluene, p-azotoluene, and similar related substituted and non-symmetrical compounds containing non-reactive groups, such as for example, hydroxyl groups to enhance the solubility in aqueous or alcohol type solvents. It is to be realized that the addition of these non-reactive groups to the aromatic structure can be tailored so as to achieve the desired solubility by standard organic methods well-known and that the essence of the inhibitor is in the azo structure.

The electrolytes with which the above additives may be used can vary widely in composition, and still be satisfactory for use with many units. In general, however, optimum results are only obtained with electrolytes containing on a weight basis from about 10 to about 60% of the borate ion present in either the form of boric acid or ammonium pentaborate and containing from about 30 to about 80% by weight of ethylene glycol or other polyhydric glycols, and the specific additives indicated, in an amount of from ½ to about 5% by weight, and the balance water. Occasional other additives, such as dihydrogen phosphate, can be used in these electrolytes. During their formation they are heated to a temperature of about 120° C. for periods varying from 5 minutes to 25 minutes in order to create desired viscous properties and conductivity. The additives of the instant invention can be added to the compositions prior to such heating with a minimum of difficulty. They can be added after the heating is complete, although complete intermixture of them within the ingredients is somewhat difficult to accomplish at this time. It is preferred that they are placed in solution, although some effective action results when they are distributed in a finely divided form.

Inasmuch as the exact mechanism of corrosion within electrolytic condensers is not specifically known at the present time, it follows that the mechanism of the action of the azoaromatic compounds listed herein as additives is not specifically known either. Surprisingly enough, most of the common corrosion inhibitors of electrostatic capacitors are ineffective with the condensers of the present invention.

An alternative means for the incorporation of the anticorrosive compound into the electrolytic capacitor is to deposit the anticorrosive compound upon the surface of the oxide film which forms a primary dielectric of the electrolytic type capacitors. After the anode has been etched and formed in accordance with techniques well-known in the art, this formed foil is passed through a solution of azobenzene or other anticorrosive compound falling within the scope of this invention and the foil is thereafter dried leaving a residue of azobenzene upon the surface of the oxide film. This oxide film structure is such that the azobenzene or alternatively any of the other anticorrosive compounds can penetrate into the many minute crevices of the oxide structure and thereafter remain when the anode is incorporated into the electrolytic capacitor structure. By depositing a thin inherent film of the anticorrosive substance immediately adjacent to the oxide film which forms the primary dielectric of the electrolytic capacitor, the anticorrosive substance is at the place where corrosion would tend to start, namely the surface of the oxide film. The result shows that the corrosive elements contained in the electrolyte thus cannot even begin their initial action without meeting the inhibiting tendency of the anticorrosive substance. A further alternative which also falls within the scope of this invention is to deposit the anticorrosive substance upon the fibers of the spacer material prior to incorporation into the electrolytic capacitor and additionally prior to the impregnation of the unit. This latter technique, though quite effective, is not nearly as spectacular as the deposition of the anticorrosive substance on the oxide film as in this latter case the azobenzene or other inhibiting compound must first be solubilized in the electrolyte before it can exert its remarkable influence upon the corrosive qualities of the electrolyte.

The deposition of a large amount of azobenzene and other disclosed anticorrosive compounds makes possible a large reservoir of these substances to be incorporated as needed into the electrolyte and thus eliminating for all practical purposes any difficulties attendant with solubility of these substances in the electrolyte. As the amount of the inhibitor in the electrolyte is decreased by means of the inhibition of the corrosion of these deletory substances present in the electrolyte, an additional amount of the anticorrosive substance is solubilized into the electrolyte to replace that used up and thus you have a large reservoir of the material.

For the purpose of illustration, the following specific examples are listed. These examples are not to be considered as limiting the invention in any manner.

*Example I*

High purity (99.9%) aluminum tabs of 25 mil thickness and 3/16" wide and 2½" long were boiled for 2 minutes in a 10% borax solution. The samples were then water rinsed and electrically formed in a 12% boric acid solution at a temperature of 90° C. with an applied voltage of 550 v. D. C. The initial current density was maintained at 150 milliamperes per square inch until a voltage of 550 was reached after which they were allowed to form at this voltage until the leakage current had dropped to 1.5 milliamperes per square inch. The formed tabs were placed in an electrolytic cell with one tab as the cathode and another one as the anode. Two cells prepared in this manner were arranged in parallel across a common voltage source. An electrolyte, ammonium pentaborate (46%), ethylene glycol (42%), and boric acid (12%), containing 12 parts per million of chloride ion, was placed in each cell. One of the cells also had two percent of azobenzene added to the electrolyte. The cells were placed in a constant temperature oven regulated at 105° C. and connected to a 460 v. direct current source. After the solutions had obtained a temperature of 105° C. the voltage was applied to the cells and periodic readings were made. The results are:

| Time (hours) | Electrolytic Solution, microamperes | Electrolytic Solution +2% Azobenzene, microamperes |
|---|---|---|
| 0 | 45 | 3 |
| 21.5 | 15 | 1 |
| 28 | 2.4 | .62 |

Comparatively little corrosion was noted with the cathode and the anode of cells in which azobenzene was used as an inhibitor.

*Example II*

A satisfactory electrolyte was formed utilizing 60% ethylene glycol, 20% ammonium pentaborate, 16% water, and 4% o-azotoluene.

*Example III*

A satisfactory electrolyte was formed using 50% ethylene glycol, 20% boric acid, 26% ammonium pentaborate, and 2% 2,2'-azo-naphthalene, and the balance water.

As many apparently widely different embodiments of my invention may be made without departing from the spirit and scope hereof, it is to be understood that my invention is not limited to the specific embodiments hereof except as defined in the appended claims.

What is claimed is:

1. An improved gelled electrolyte composition which consisting essentially of from about 10% to about 60% by weight of a compound containing the borate ion, said compound of the group consisting of boric acid and ammonium pentaborate, from about 30% to about 80% by weight of ethylene glycol and from about ½ to about 5% by weight of an aromatic azo compound of the group consisting of azo benzene, azo naphthalene, and azo toluene, and the remainder water.

2. An electrolyte consisting essentially of 45% by weight ammonium pentaborate, 41% by weight of ethylene glycol, 12% by weight boric acid and 2% by weight of azo benzene.

3. An electrolyte consisting essentially of 50% by weight ethylene glycol, 20% by weight of ammonium pentaborate, 4% by weight o-azo toluene, and the remainder water.

4. An electrolyte comprising 50% by weight ethylene glycol, 20 by weight boric acid, 26% by weight ammonium pentaborate, 2% by weight 2,2'-azo naphthalene, and water.

References Cited in the file of this patent
UNITED STATES PATENTS

| | | |
|---|---|---|
| 2,077,429 | McMahon | Apr. 20, 1937 |
| 2,505,180 | Georgiev et al. | Apr. 25, 1950 |